United States Patent [19]

Leumann et al.

[11] Patent Number: 4,532,709
[45] Date of Patent: Aug. 6, 1985

[54] HIGH PRECISION ELECTRONIC DIGITAL MEASUREMENT SYSTEM WOUND ON CONSTANT-TORQUE-CONTROLLED DRUM

[75] Inventors: Hans E. Leumann, Washington; Kenneth S. Gerkey; Mark E. Wylie, both of Mt. Lebanon, all of Pa.

[73] Assignee: Westinghouse Electric Corp., Pittsburgh, Pa.

[21] Appl. No.: 663,264

[22] Filed: Oct. 22, 1984

[51] Int. Cl.³ .............................................. G01B 7/02
[52] U.S. Cl. ........................................ 33/140; 33/125 R
[58] Field of Search ................ 33/125 M, 129, 125 R, 33/138–140, 141 R, 141 E

[56] References Cited

U.S. PATENT DOCUMENTS

| 3,526,890 | 9/1970 | Malina et al. | 33/141 E X |
| 3,566,477 | 3/1971 | Williams | 33/139 X |
| 4,057,904 | 11/1977 | Vrabel et al. | 33/140 X |
| 4,186,490 | 2/1980 | Quenot | 33/139 |

FOREIGN PATENT DOCUMENTS

| 56-96207 | 8/1981 | Japan | 33/137 L |
| 2052745 | 1/1981 | United Kingdom | 33/140 |
| 2060899 | 5/1981 | United Kingdom | 33/139 |

Primary Examiner—Robert S. Ward
Attorney, Agent, or Firm—Thomas R. Trempus

[57] ABSTRACT

A system for ascertaining dimensions which comprises a measuring module and several gage extenders which can be used either alone or in combination with gaging blocks. The measuring module includes a drum member rotatably mounted on a support and at least one measuring member operably associated with the drum member. At least one end of the measuring member extends from the drum such that for rotational movement of the drum member in a first direction the free end of the measuring member is drawn up onto the drum and for rotational movement in a second direction the free end of the measuring member is played out from the drum member. The drum is rotated at a constant torque and the rotational movement of the drum is transmitted to a rotational position transducer. The rotational position transducer provides an output signal which is used in part to generate an electronic readout reflective of the movement of the measuring member. The gage extenders consist of elongated members which can be used individually with the measuring module or in combinations of two or more gaging members with the measuring module. The gaging members are of a predetermined length. The measuring system consisting of the measuring module and gaging members can be used in combination with gaging blocks for the purpose of measuring inside dimensions of workpieces.

18 Claims, 11 Drawing Figures

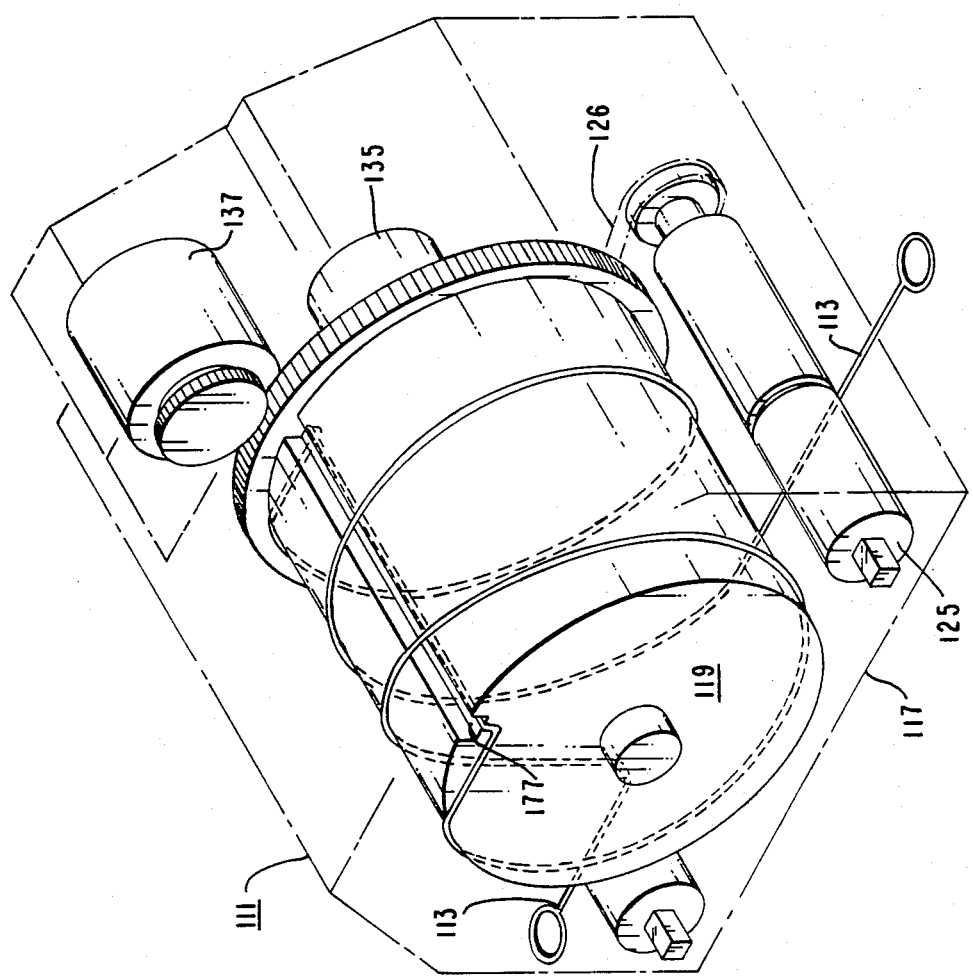

HIGH PRECISION ELECTRONIC DIGITAL MEASUREMENT SYSTEM WOUND ON CONSTANT-TORQUE-CONTROLLED DRUM

BACKGROUND OF THE INVENTION

The invention relates to a technique for ascertaining dimensions, such as large diameters or lengths. More particularly, the present invention provides a high precision measurement system consisting of several components disclosed herein by unique alternative embodiments.

Quite often, a workpiece is of such a configuration as to render the use of conventional measurement techniques and devices quite problematic. The precise measurement of such configurations can be quite difficult for any of a number of reasons including, for example, those situations which depend on judgment or feed of an operator or inspector to effectively carry out the measurement.

It is therefore an object of this invention to provide a technique whereby an automated electronic digital readout high precision measuring apparatus with a tape which is tightened automatically and which displays the measurement.

It is also an object of this invention to provide a measuring system particularly useful for closed perimeters such as the circumference of cylindrical shapes and for measuring the length between two points to which the ends of this high precision measuring device can be connected.

It is yet another object of this invention to provide a high precision measurement system for use in very large inside diameters or complex configurations such as found along the inside configuration of turbine housing or lengths not conveniently measured by conventional methods.

It is still another object of this invention to provide a measurement system for use in combination with gaging blocks that can be held firmly in place against the element to be measured and regardless of the material from which the workpiece is constructed.

It is yet another object of this invention to provide a high precision measurement system which utilizes in combination gaging blocks, gage extenders and an automated measuring tape.

SUMMARY OF THE INVENTION

In its broadest configuration, the present invention provides a system for ascertaining dimensions comprising several individual components which, as will be appreciated, can be used individually or in several combinations. The fundamental component of this invention is a measuring module which comprises a support means in which a drum member is rotatably mounted. A measuring member is operably associated with the drum member and has at least one end which extends from the drum member such that for the rotational movement of the drum member in a first direction at least one end of the measuring member extending from the drum member, is drawn up onto the drum member. For rotational movement in a second direction the at least one end of the measuring member extending from the drum member is played out from the drum member. The measuring module also includes means for providing a predetermined value of constant torque to the drum member in order to affect the rotational movement of the drum member. Means for generating an output signal reflective of the rotational movement of the drum member, such as a rotational position transducer, is operably associated with the drum member. In an alternative embodiment, a second measuring member is also operably associated with the drum member. In this alternative embodiment rotation of the drum in a first direction will cause the free ends of both measuring members to be drawn up onto the drum. In rotation in the opposite direction the free ends of each of the measuring members are played out from the drum. Circuitry which is responsive to the output of the rotational position transducer is utilized to provide a readout indicative of the dimension ascertained by the measuring module.

Another of the components which forms part of the system of this invention is a gage extender. The gage extender is an elongated member with fastening means disposed at each end thereof. The total longitudinal dimension of each gage extender member is of a predetermined very precise value and one or more of these gage extenders can be used in combination with the measuring module for measuring very large dimensions. The fastening means can be, for example, a magnetic device or a hook and eye combination.

The measuring module with or without gage extenders can be used in combination with a gaging block for measuring large inside diameters or dimensions. The gaging block is selectively attachable to a surface of a workpiece and comprises a body having a first face adapted to conform to the workpiece surface and a second face defining a measurement reference surface. The first face includes a recess portion therein. The gaging block body also includes port means in communication with the recess portion and adapted to be in communication with a negative pressure generating means. The gaging block is removably secured to the workpiece surface by the generation of a negative pressure in the first face recess portion.

BRIEF DESCRIPTION OF THE DRAWINGS

The above as well as other features and advantages of the present invention can be appreciated through a consideration of the detailed description of the invention in conjunction with the accompanying drawings in which:

FIG. 3 is a somewhat schematical representation of a double ended measuring module with portions thereof cut away, all according to the teachings of this invention;

DESCRIPTION OF THE PREFERRED EMBODIMENTS

The automated electronic digital readout high precision measuring system of this invention can be used for measuring closed perimeters, that is, the circumference of cylindrical shapes, as well as for measuring the length between two points to which the ends of the measuring member(s) of this device can be connected. The measuring system includes a measuring module and one or more gage extenders. These two devices can be used in combination with gaging blocks in order to measure inside diameters. While several embodiments incorporating the unique features of this invention are described in detail herein, it is to be understood that specific elements in each embodiment described are not limited to use in that particular embodiment and can be incorporated in the alternative embodiments of the invention.

Figure 1:
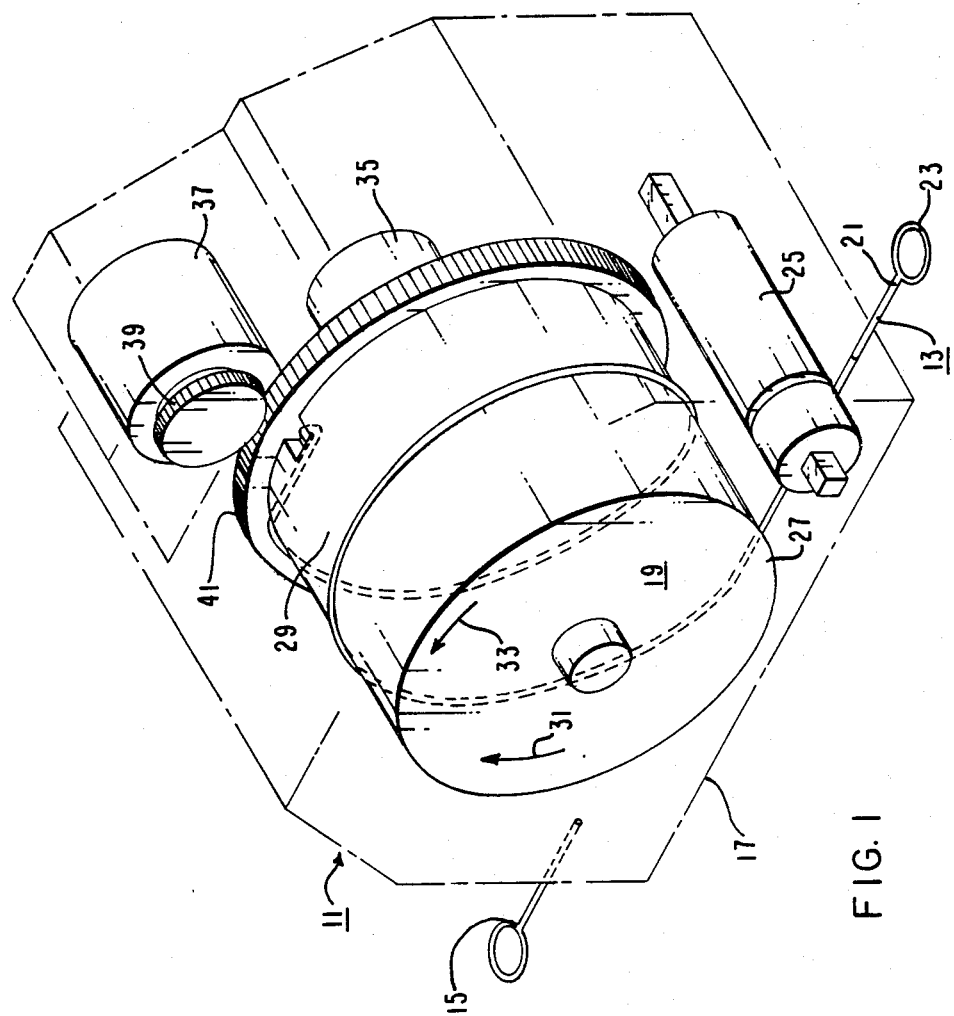
FIG. 1 is a somewhat schematical representation of a single ended measuring module with portions cut away, all according to the teachings of this invention.

Turning now to FIG. 1, a somewhat schematical representation of a single ended measuring module with portions cut away is generally indicated by the reference character 11. By single ended measuring module what is meant is that a single movable measuring member 13 is used in combination with a fixed measuring member 15. The measuring module 11 includes a support means 17 which provides a base and structural framework which supports the individual components of the measuring module. A drum member 19 is rotatably supported by the support means 17. The measuring member 13 is operably associated with the drum member 19 and has at least one end thereof extending from the drum member. The at least one end 21 of the measuring member 13 extending from the drum member 19 includes interconnecting means 23 for use in combination with gage extenders and/or gaging blocks as will be described below. The end 21 can be, for example, one member of a hook and eye combination or a magnetic member. A tensioning roll 25 can be disposed between the end of the measuring member 21 and the drum member 19 can be provided with a synchro drive to control the rotation of the tensioning roll. The tensioning member 25 is also mounted in the support means 17.

Figure 2:
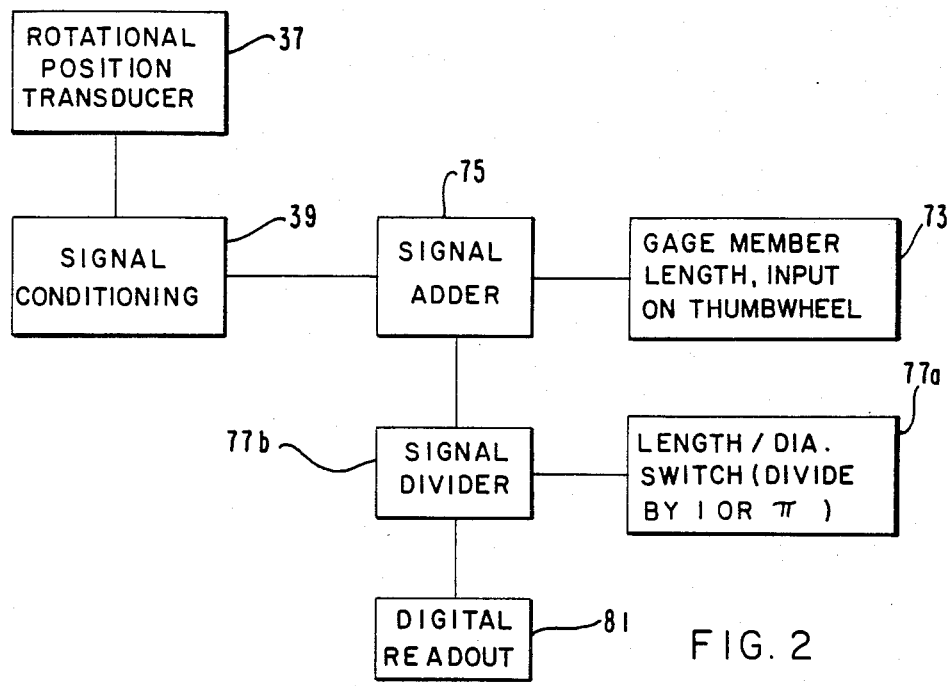
FIG. 2 is a block diagram illustrating the measuring system of this invention.
Figure 4A:
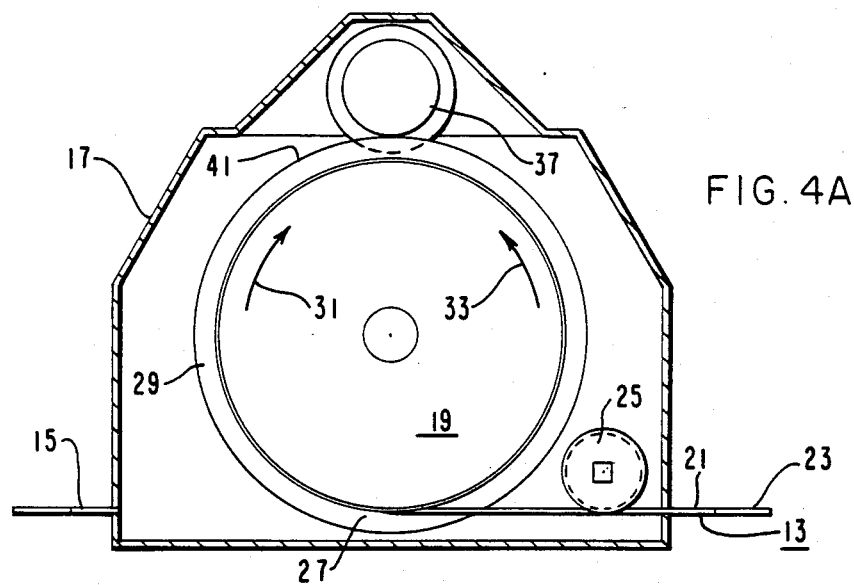
FIG. 4A is a functional schematical illustration of the technique whereby the measuring member is disposed about the drum member of the measuring module illustrated in FIG. 1.

Using the front of the measuring module 11 as viewed in FIG. 1 as a reference point and FIG. 4A, the measuring member 13 is disposed as follows about the tensioning roll 25 and the drum member 19. Beginning at the free end 21 of the measuring member 13, the measuring member is wrapped in a clockwise direction beginning at the bottom portion of the tensioning roll about the tensioning roll. The measuring member is wrapped at least once about the tensioning roll 25 prior to contacting the drum member 19. Beginning at the bottom of the drum member as at 27, the measuring member is wrapped in a clockwise direction about the outer surface 29 of the drum member 19 and secured thereto. The total length of measuring member wrapped about the drum surface 29 is dependent upon a maximum predetermined measurement value. While it is of course possible to provide a substantial length of measuring member wrapped about the drum 19, it is preferred that the maximum length be a function of the length of the gage extenders used in combination with the measuring module as will be described in detail hereinafter. As can be seen from the illustration the rotational movement of the drum member 19 in a first, clockwise direction as indicated by the arrow 31 will cause the free end 21 of the measuring member 13 to be drawn up toward the drum member. In a second, counterclockwise rotational direction as indicated by the arrow 33, the at least one free end of the measuring member 13 is permitted to be played out from the drum member. A constant torque motor 35 or similar device such as a limited slip manually actuated clutch and crank mechanism is used to provide a predetermined value of torque to the drum member 19. The torque motor 35 provides a constant tensioning of the measuring member, so that the same operator or any number of different operators always obtain the same measurement for a given dimension. Communication between the constant torque motor 35 and the drum member 19 can be through a belt or direct gear or direct shaft mounted technique. Preferably, the constant torque motor 35 would only be required to provide rotational movement in one direction, in the embodiment illustrated herein this would be the clockwise direction required to draw the measuring member up onto the drum. When the constant torque motor 35 is disengaged, the drum member can be permitted to free wheel so that the measuring member 13 can be played out as required. A rotational position transducer 37 is in communication with the drum member 19 by means of intermeshed gears of the transducer and drum member at 39 and 41 respectively. The rotational position transducer 37 generates an electrical output reflective of the rotational movement of the drum. The electrical output of the transducer 37 is provided to a circuit means represented by the block diagram of FIG. 2 in order to generate some indicia reflective of the measurement obtained by the measuring module. Because the circuitry used herein is generally known and available it will only be described in functional terms which relate to the technique required to use the present measuring module and gage extenders. Because it is necessary to appreciate how both the gage extenders and measuring module cooperate, a further discussion of the block diagram of FIG. 2 will be postponed.

Figure 6:
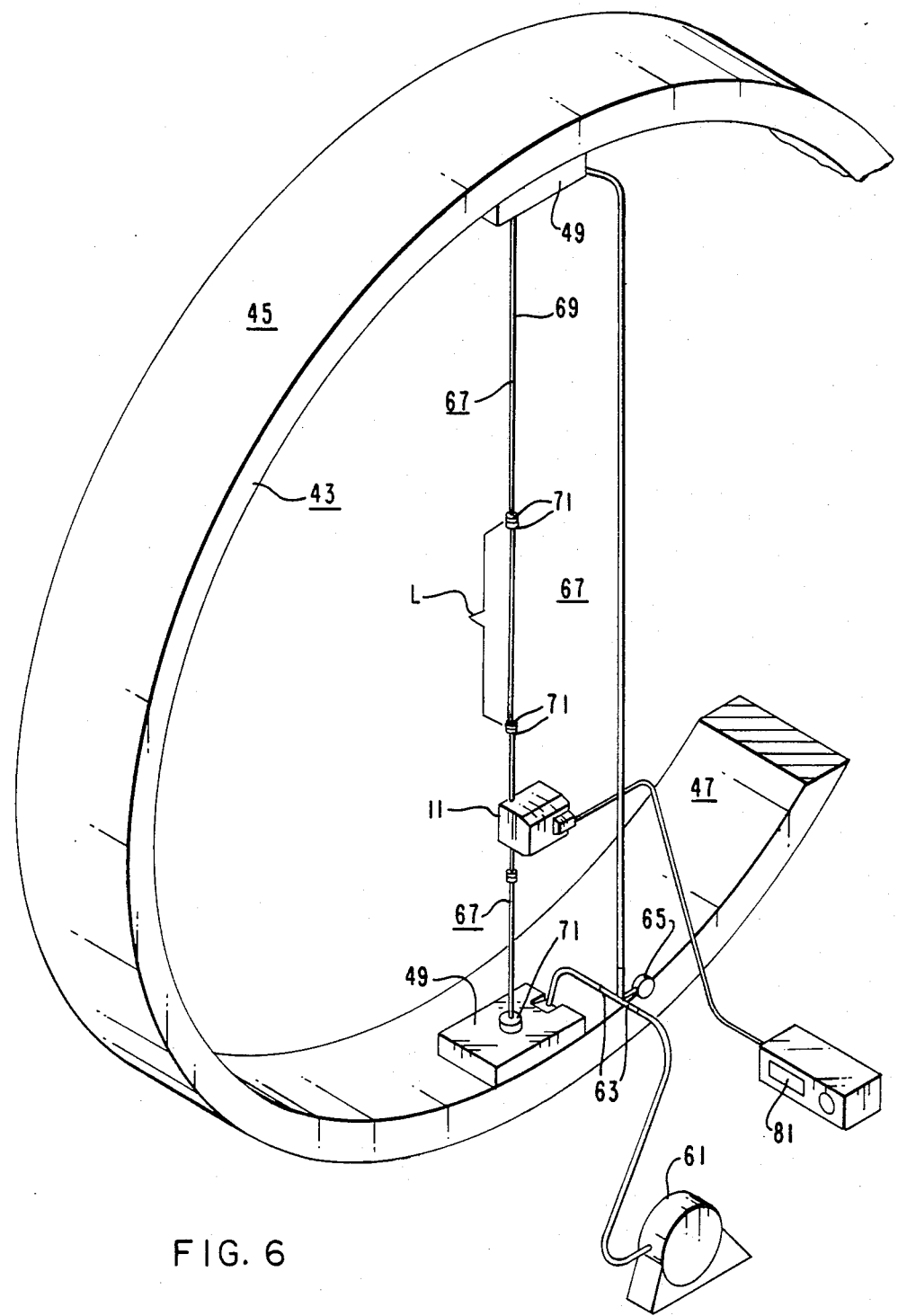
FIG. 6 is a perspective view of a cylindrical member onto the inside diameter of which is mounted the measuring system of this invention by means of gaging blocks.
Figure 7A:
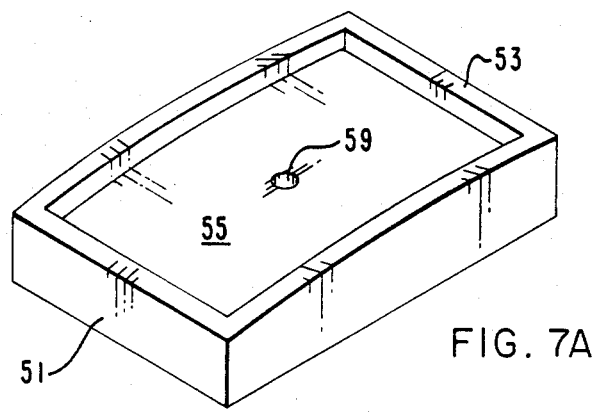
FIGS. 7A and 7B are perspective views of gaging blocks securable to a workpiece surface by means of a negative pressure which are used in combination with the present invention.
Figure 7B:
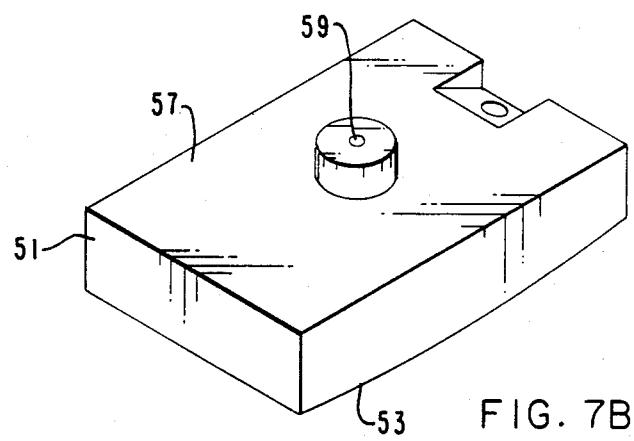

Turning briefly to FIG. 6, the basic operation of the invention can be understood. A large cylindrical workpiece 43 has an outside surface 45 and an inside surface 47. Gaging blocks 49 which are generally known in the art, are provided at opposite points on the inside surface of the cylindrical workpiece 43 in order to provide reference points from which a measurement can be taken. The gaging blocks 49 can be seen more clearly in FIGS. 7A and 7B. The gaging block consists of a body portion 51 with a first face 53 adapted to conform to a workpiece surface. The first face 53 also includes a recess portion therein as at 55. A second face 57 of the body 51 defines a measurement reference surface. The body 51 includes a port 59 in communication with the recess portion 55 of the first face and adapted to be in communication with a negative pressure generating device such as the vacuum generator 61 shown in FIG. 6. Communication between the port 59 and the vacuum generator 61 is affected by means of vacuum hose 63 which can be provided with a vacuum gage 65. The gaging block is removably secured to the workpiece surface by the generation of a negative pressure in the recessed portion as the first face rests against the workpiece surface.

Gage extenders are generally indicated by the reference character 67 and include an elongated portion 69 with interconnecting members 71 disposed at each end thereof. The very precise total length of a gage member 67 includes both the elongated portion and the interconnecting members and is of a predetermined value selected according to the requirements of the dimensional tolerance of measurement. Typically, the total length of an individual gage extender 67 would be 12 inches. Thus, in order to measure dimensions significantly greater than 12 inches, either longer gage extenders could be employed or several smaller gage extenders interconnected. Preferably, the interconnecting means 71 disposed at each end of the gage extender is a magnetic member which could be conveniently used with a metal gaging block of the type described above. Additionally, the interconnecting means 23 provided at the free end 21 of the measuring member 13 can also be a magnetic device for using in combination with either the magnetic ends of the gage extender or the gaging blocks. In FIG. 6, the gage extenders are of a length equal to "L" and the measuring member of the measuring module 11 when fully played out from the drum member 19 is at least equal to "L". Thus, the combination of the measurement provided by the gaging blocks 49 and the gage extenders 67 provide a known value which is added to the measurement value as determined by the module 11.

Returning to FIG. 2, the output of the rotational position transducer provides a value X which is combined with a value determined from the number of gaging blocks and gage members employed in the measurement process. In addition to the signal generated at block 39 representative of the value ascertained by the measuring module 11, a manual input is provided via block 73 which represents the total length resulting from the various gage members used and when appropriate a value representative of the dimension provided by the gaging blocks. The output signals from blocks 39 and 73 are combined by signal adder means 75 and further manipulated as necessary at blocks 77a+b. Further manipulation of the signal might be required in the case of a diameter measurement in which it is necessary to divide the total value obtained at the signal adder block 75 by a constant such as $\pi$. The final output signal from block 77b can be displayed by a digital readout device or the like 81 for displaying indicia.

Figure 4B:
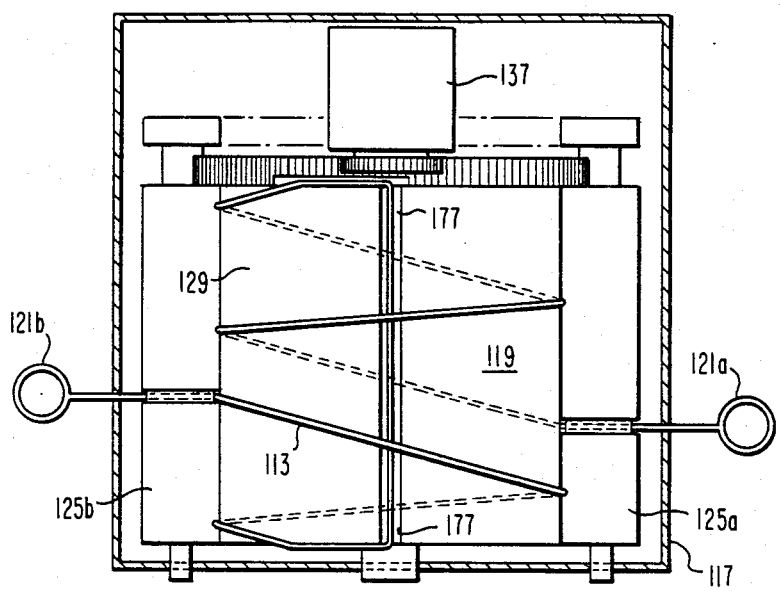
FIGS. 4B and 4C are functional schematical illustrations of the technique whereby the measuring members are disposed about the drum member of the measuring module illustrated in FIG. 3.

An alternative embodiment of the present invention is a double ended measuring module shown in FIGS. 3 and 4B and generally indicated by the reference character 111. Contrary to the first embodiment in which only a single measuring member was drawn onto or played out from a drum member, the double ended module provides two measuring members 113. The two measuring members 113 can in reality be a single continuous member which is wrapped about the drum member 119. The measuring module 111 includes a support means 117 which provides a framework on which is mounted a drum member 119 for rotational movement and tensioning rolls 125 disposed on either side of the drum member 119. The tensioning rolls 125 can be controlled by a tension roll synchro-drive somewhat schematically indicated at 126. A constant torque motor 135 is provided to effect the rotational movement of the drum member 119 according to a technique described in connection with the first embodiment. Also, a rotational position transducer 137 is in communication with the drum member 119 and responsive thereto, generating an output signal compatible with the previously described electronic system.

Figure 4C:
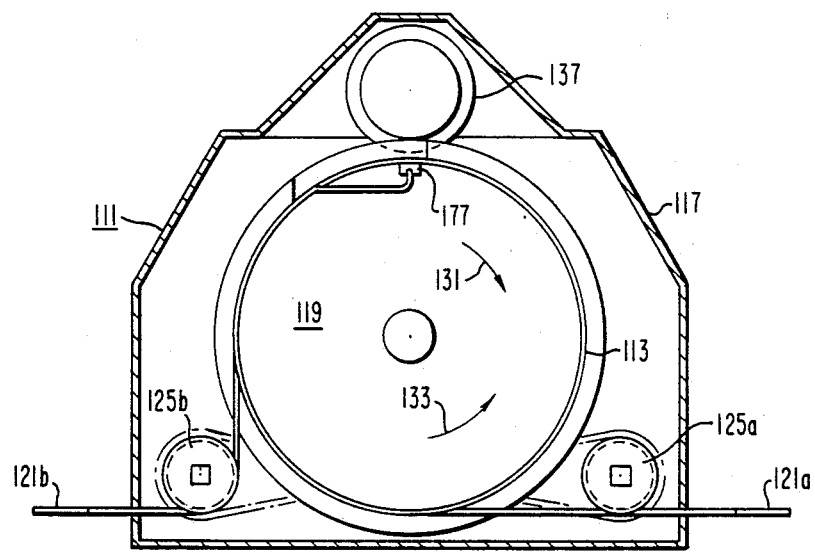

Turning to FIG. 4B there is illustrated a functional schematic of the technique whereby a continuous measuring member 113 is disposed about the tensioning members 125 and the drum member 119. The continuous wrapped measuring member 113 is wound about the drum member 119 so that for a first, clockwise rotational movement of the drum as indicated by arrow 131, both ends 121a and 121b of the measuring member 113 are drawn onto the drum surface 129. For rotational movement of the drum in a second, counterclockwise direction as indicated by arrow 133, both ends 121 of the continuous measuring member 113 are played out from the drum member 119. A generally axially aligned slot 177 is disposed in the surface 129 of the drum member to receive therein the center portion of the continuous measuring member 113. In FIG. 4, the path which the continuous measuring member travels about the tensioning rolls and the drum member can be understood by beginning with end 121a of the measuring member and continuing through to the opposite end 121b. The measuring member at 121a travels below the tensioning roll 125a and then in a clockwise direction makes at least one full revolution about the outside surface of the drum and then enters slot 177 in the surface 129 of the drum. The continuous measuring member travels along the slot to the opposite face of the drum and then returns to the surface of the drum and travels in a counterclockwise direction therefrom at least one full revolution about the outside surface of the drum. Passing the bottom of the drum, the continuous member then travels past the tensioning roll 125b. Preferably in both cases in which the continuous measuring member is engaged by the tensioning rolls 125, the measuring member makes one complete wrap about the outside surface thereof. By arranging the continuous measuring member about the drum and tensioning rolls as described above, regardless of the rotational direction of the drum both ends of the continuous measuring member will either be drawn toward or played out from the drum. Also, as can be noted in FIG. 4, the tension roll synchronous drive system can be in the form of a belt drive disposed about both tensioning rolls so that a single drive means can be employed to affect the desired directional movement of the tensioning rolls.

The maximum number of times the continuous measuring member is wrapped about the drum surface is determined solely by the maximum dimension to be measured by the measuring module. Preferably, the minimum measuring distance which the module will be capable of measuring will be at least as great as the minimum length of the gage extender to be used in combination with this device.

Figure 5A:
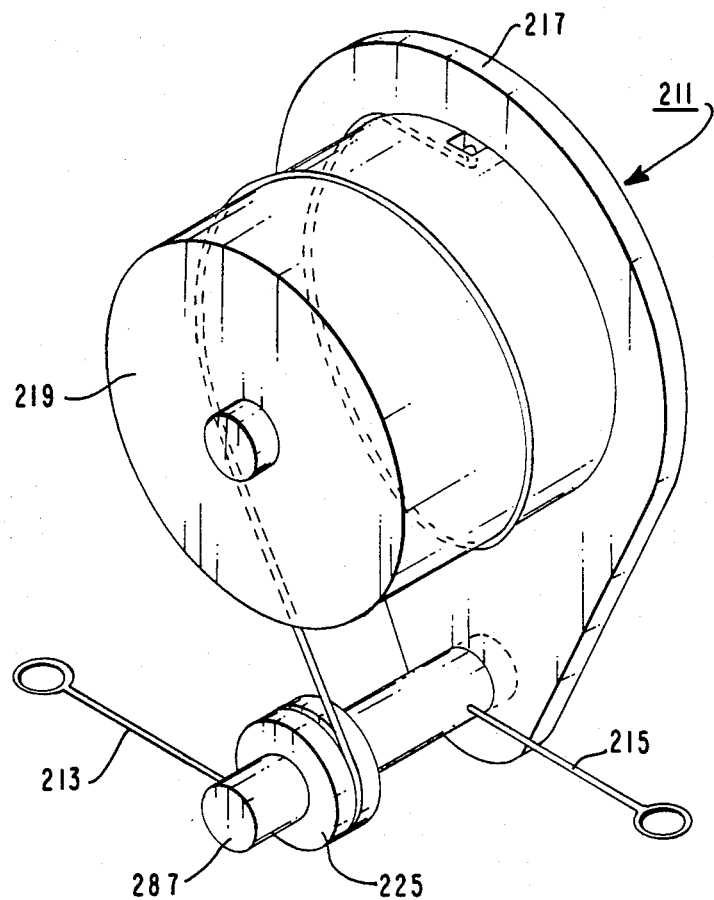
FIGS. 5A and 5B are an alternative embodiment of a double ended measuring module with portions cut away.
Figure 5B:
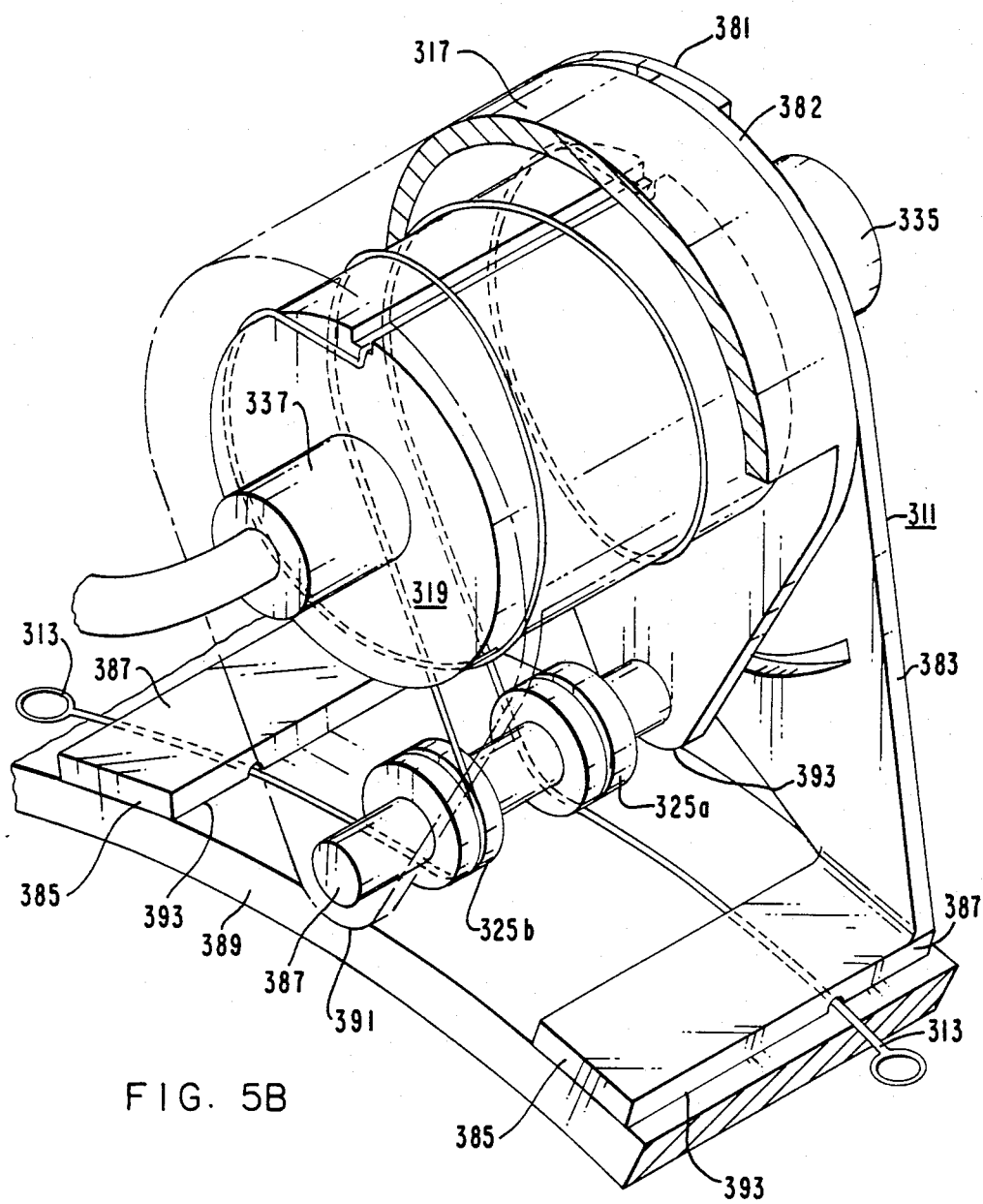

Turning now to FIGS. 5A and 5B, alternative embodiments of the present invention which are particularly useful in measuring curved surfaces because they eliminate chordal deviations are illustrated. These embodiments accommodate curvature in workpieces to be measured and ensure required high precision and reliability. A single ended measuring module generally indicated by the reference character 211 is shown with portions cut away in FIG. 5A. The double ended module 311 shown in FIG. 5B includes structural details which, while not shown in the single ended embodiment, function similarly therewith.

As can be seen in FIG. 5B, a double ended measuring module generally indicated by reference character 311, is placed on a curved workpiece surface 389. A support means or case 317 supports the rotatably mounted drum member 319 and tensioning wheels 225a and 225b. A pair of adjustable legs 381 and 383 are pivotably attached to the case and can be adjustable by, for example, screw or gear means to provide a proper radius for the feet 387 in relation to the workpiece 389. The bottom portion 391 of the case 317 can provide a reference point for use when adjusting the stance of the legs 381 and 383. With the bottom of the case 391 resting against the workpiece, the legs 381 and 383 are positioned such that all three surfaces indicated by the character 393 are resting against the surface of the workpiece. When either of the alternative measuring modules 211 or 311 are so disposed on a work surface any deviations in the measurement obtained are substantially eliminated. A single axis 387 about which tensioning members 325a and 325b are mounted is disposed proximate the lower portion 391 of the case 317 in such a relation therewith that the continuous measuring member 313 extending therefrom is a minimal distance above the work surface. The tensioning members 325a and 325b can be so geared on the axis 387 that counter rotational movement relative to each other can be effected by servo motor means not illustrated herein. In the double ended module 311 a continuous measuring member 313 is disposed about the tensioning wheels and drum member in a manner previously illustrated in connection with the embodiment shown in FIG. 3 and will therefore not be discussed in detail in conjunction with this embodiment. Similarly, a torque motor 335 is provided to apply constant rotational torque to the drum member 319 when affecting measurement with this device and a rotational position transducer 337 is also in communication with the drum member 319 in order to generate an output signal reflective of the rotational movement of the drum member.

In the single ended embodiment 211 of FIG. 5A, the support means 217 includes leg members as described in connection with the embodiment of FIG. 5B. A drum member 219 is rotatably mounted on the support means 217 and a tensioning roll 225 is rotatably mounted on fixed axis 287. The movable measuring member 213 is operably associated with the tensioning roll 225 and drum member 219 according to the technique described in connection with FIG. 1. The fixed measuring member is secured to the fixed axis 287.

In using any of the embodiments described herein, typically an operator would select one or more gage extenders of the required length and the appropriate input would be provided to the measuring circuitry. The interconnecting means on the measuring members of the module would be loosely connected to the gage extenders either around the circumference by attaching the free end of the extender to the free end of the measuring module or along a straight line by attaching the free end of the extender to one end point and the free end of the measuring module to the opposite end point. The operator would select the appropriate measuring technique whether it be length or diameter. Upon activation of the constant torque motor the measuring module would tighten the length of measuring member loosely mounted above to a constant and highly accurate and repeatable tension. The rotational movement of the drum as it draws up the measuring member is reflected in the output of the rotational position transducer, the output of which is utilized in combination with the previously entered extender length inputs to provide a combined electronic signal representative of the length measured and of the required measurement tolerance.

What has been described is a large diameter or length measurement system which utilizes a measuring module having at least one movable measuring member associated therewith and one or more gage extender members. Additionally, this measuring system can be used in combination with gaging blocks to provide dimensions of large inside diameters, lengths, perimeter or the like. While several distinct embodiments have been illustrated and described herein, it is to be understood that the individual features associated with any one embodiment can be incorporated with any other embodiment without departing from the spirit and scope of the invention as defined by the claims.

We claim:
1. A measuring module comprising:
   (a) support means;
   (b) a drum member rotatably mounted on said support means;
   (c) a measuring member operably associated with said drum member and having at least one end thereof extending from said drum member such that for the rotational movement of said drum member in a first direction said at least one end is drawn up onto said drum member and for rotational movement in a second direction said at least one end is played out from said drum member;
   (d) means for providing a predetermined value of constant torque to said drum member in communication therewith in order to effect the rotational movement thereof whereby a constant and repeatable tensioning of said measuring member is effected; and
   (e) means for generating an output signal reflective of the rotational movement of said drum member, operably associated with said drum member.

2. The measuring module according to claim 1 including a fixed measuring member extending from the support means and having a free end distal therefrom and whereby only one end of the measuring member operably associated with the drum member extends therefrom such that the free end of said fixed member and said measuring member cooperates to effect a desired measurement.

3. The measuring module according to claim 2 wherein the support means includes a pair of adjustable leg members pivotally secured at one end thereof to said support means, whereby said adjustable legs are adaptable to a contoured surface.

4. The measuring module according to claim 1 wherein the support means includes a pair of adjustable leg members pivotally secured at one end thereof to said support means, whereby said adjustable legs are adaptable to a contoured surface.

5. The measuring module according to claim 1 in combination with a circuit means responsive to the output signal reflective of the rotational movement of the drum member, said circuit means including means for displaying indicia.

6. The measuring module according to claim 1 wherein the at least one end of the measuring member extending from the drum member includes interconnecting means for securing said at least one end to a desired location.

7. The measuring module according to claim 2 wherein the fixed measuring member includes interconnecting means at the free end thereof.

8. The measuring module according to claim 1 wherein the means for providing a predetermined value of constant torque to the drum member is a constant torque motor.

9. A system for ascertaining dimensions comprising a measuring module including
   (a) support means;
   (b) a drum member rotatably mounted on said support means;
   (c) a measuring member operably associated with said drum member and having at least one end thereof extending from said drum member such that for the rotational movement of said drum member in a first direction said at least one end is drawn up onto said drum member and for rotational movement in a second direction said at least one end is played out from said drum member;
   (d) means for providing a predetermined value of constant torque to said drum member in communication therewith in order to effect the rotational movement thereof whereby a constant and repeatable tensioning of said measuring member is affected;
   (e) means for generating an output signal reflective of the rotational movement of said drum member, operably associated with said drum member; and
   (f) at least one gage extender member comprising an elongated member having fastening means disposed at each end thereof, the total longitudinal dimension of said gage extender member being a predetermined value.

10. The system according to claim 9 wherein the fastening means at the end of the elongated member is a magnetic device.

11. The system according to claim 9 including a fixed measuring member extending from the support means and having a free end distal therefrom and wherein only one end of the measuring member operably associated with the drum member extends therefrom such that the free end of said fixed member and said measuring member cooperates to effect a desired measurement.

12. The system according to claim 11 wherein the support means includes a pair of adjustable leg members pivotally secured at one end thereof to said support means, whereby said adjustable legs are adaptable to a contoured surface.

13. The system according to claim 9 wherein the support means includes a pair of adjustable leg members pivotally secured at one end thereof to said support means, whereby said adjustable legs are adaptable to a contoured surface.

14. The system according to claim 9 in combination with a circuit means responsive to the output signal reflective of the rotational movement of the drum member, said circuit means including means for displaying indicia.

15. The system according to claim 10 wherein the at least one end of the measuring member extending from the drum member includes interconnecting means for securing said at least one end to a desired location.

16. The system according to claim 11 wherein the fixed measuring member includes interconnecting means at the free end thereof.

17. The system according to claim 15 wherein the measuring member interconnecting means are magnetic devices which cooperate with the gage extender magnetic devices.

18. In combination with a gaging block selectively attachable to a surface of a workpiece, said gaging block comprising a body having a first face adapted to conform to the workpiece surface, said first face including a recess portion therein and a second face defining a measurement reference surface, said body also including port means in communication with said recess portion and adapted to be in communication with a negative pressure generating means, wherein said body is removably secured to the workpiece surface by the generation of a negative pressure in said first face recess portion; a system for ascertaining dimensions comprising a measuring module including
   (a) support means;
   (b) a drum member rotatably mounted on said support means;
   (c) a measuring member operably associated with said drum member and having at least one end thereof extending from said drum member such that for the rotational movement of said drum member in a first direction said at least one end is drawn up onto said drum member and for rotational movement in a second direction said at least one end is played out from said drum member;
   (d) means for providing a predetermined value of constant torque to said drum member in communication therewith in order to effect the rotational movement thereof whereby a constant and repeatable tensioning of said measuring member is effected;
   (e) means for generating an output signal reflective of the rotational movement of said drum member, operably associated with said drum member; and
   (f) at least one gage extender member comprising an elongated member having fastening means disposed at each end thereof, the total longitudinal dimension of said gage extender member being a predetermined value, and wherein one of said fastening means is adapted to be removably secured to at least said gaging block and the other of said fastening means is adapted to be removably secured to at least said measuring member's at least one extending end.

* * * * *